United States Patent
Bruskin

(10) Patent No.: US 8,782,784 B1
(45) Date of Patent: Jul. 15, 2014

(54) FRAMEWORK FOR IMPLEMENTING SECURITY INCIDENT AND EVENT MANAGEMENT IN AN ENTERPRISE

(71) Applicant: EMC Corporation, Hopkinton, MA (US)

(72) Inventor: David Bruskin, Plainfield, IL (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/625,982

(22) Filed: Sep. 25, 2012

(51) Int. Cl.
H04L 29/06 (2006.01)

(52) U.S. Cl.
USPC .................................. 726/22; 713/2

(58) Field of Classification Search
USPC ........................................ 726/22
See application file for complete search history.

(56) References Cited

U.S. PATENT DOCUMENTS

| | | | |
|---|---|---|---|
| 7,290,275 B2 * | 10/2007 | Baudoin et al. .................. | 726/1 |
| 8,060,935 B2 | 11/2011 | Kingsford | |
| 8,209,759 B2 | 6/2012 | Newton et al. | |
| 8,423,894 B2 | 4/2013 | Bhattacharya et al. | |
| 2008/0115110 A1 * | 5/2008 | Fliek et al. .................... | 717/125 |
| 2012/0311562 A1 * | 12/2012 | Wang et al. .................... | 717/177 |
| 2013/0081141 A1 * | 3/2013 | Anurag ........................... | 726/23 |

OTHER PUBLICATIONS

K. Kent and M. Souppaya, Guide to Computer Security Log Management, National Institute of Standards and Technology (NIST), Sep. 2006.*

* cited by examiner

Primary Examiner — Yogesh Paliwal
(74) Attorney, Agent, or Firm — BainwoodHuang

(57) ABSTRACT

An improved technique involves verifying whether a client has proper resources, processes, procedures and ability to successfully implement SIEM infrastructure according to a SIEM maturity evaluation metric. Along these lines, a SIEM maturity evaluation program produces a SIEM maturity result that indicates whether the client has proper resources to successfully implement SIEM infrastructure in a computing environement. For example, the SIEM maturity result indicates whether there are enough people having a certain skill set within the enterprise to properly react to events in an event log to which SIEM software receives. When the SIEM maturity result indicates that the client has proper resources, processes, procedures and ability, then the program outputs the calculate score to the SIEM evaluator and client. Otherwise, the program delays such an installation or configuration to allow the enterprise time to acquire the proper resources.

18 Claims, 9 Drawing Sheets

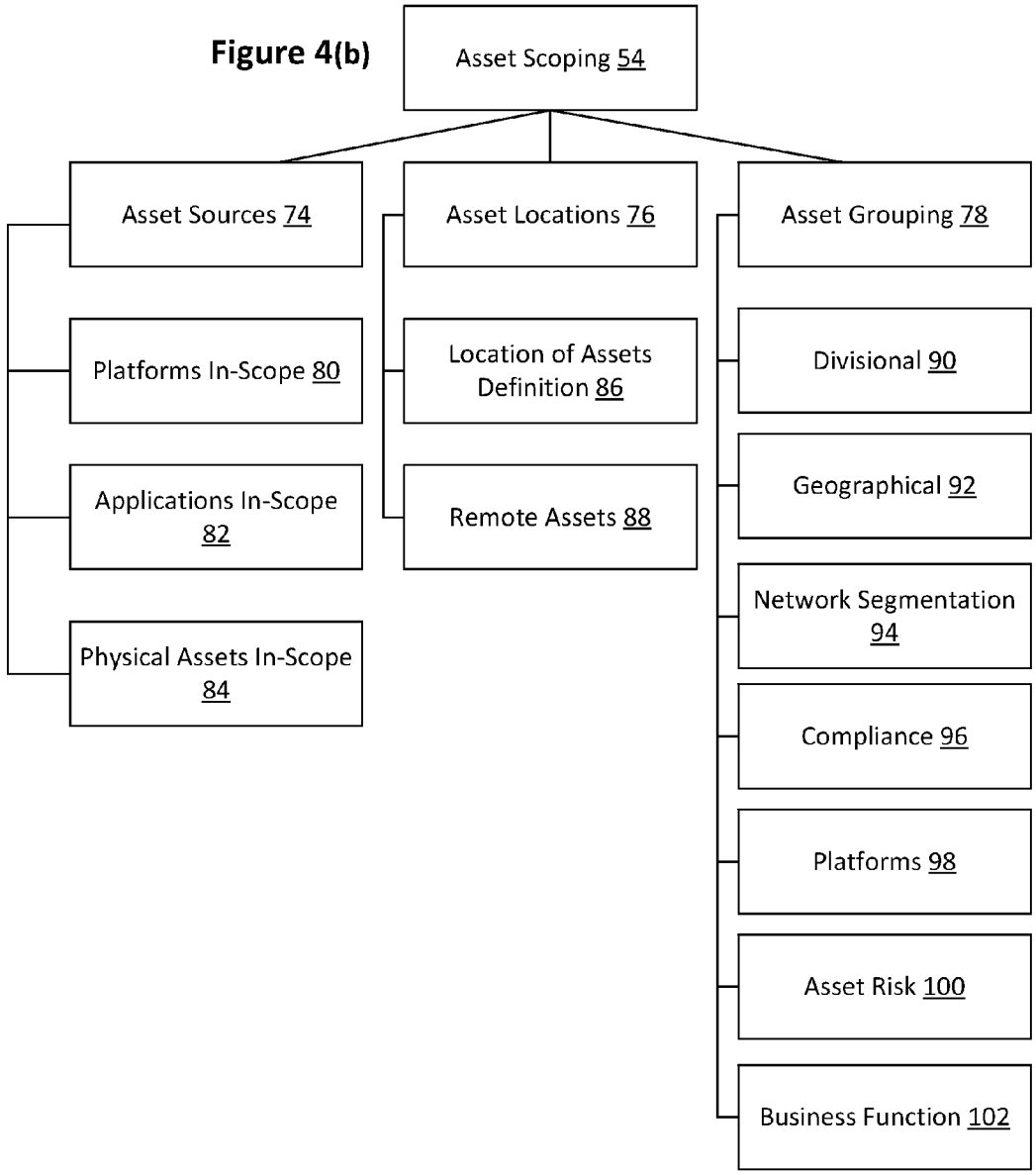

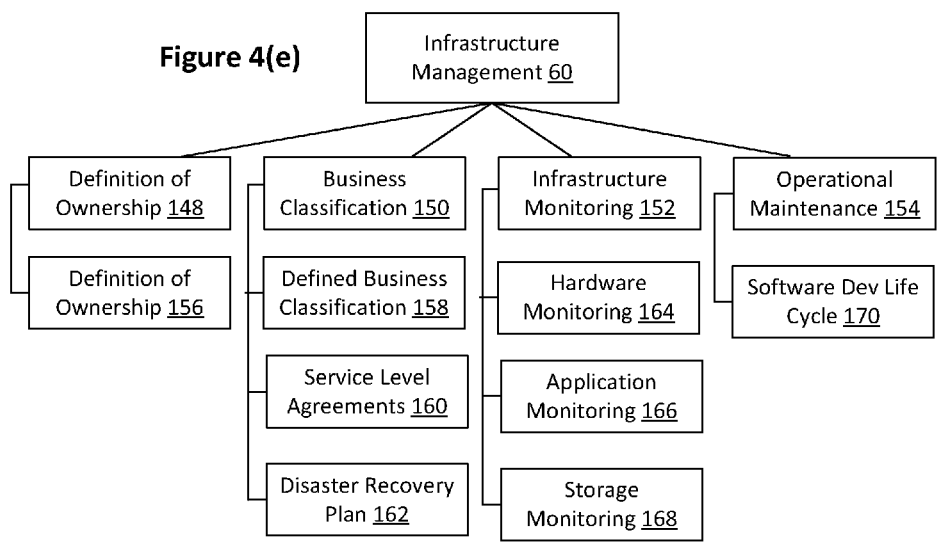
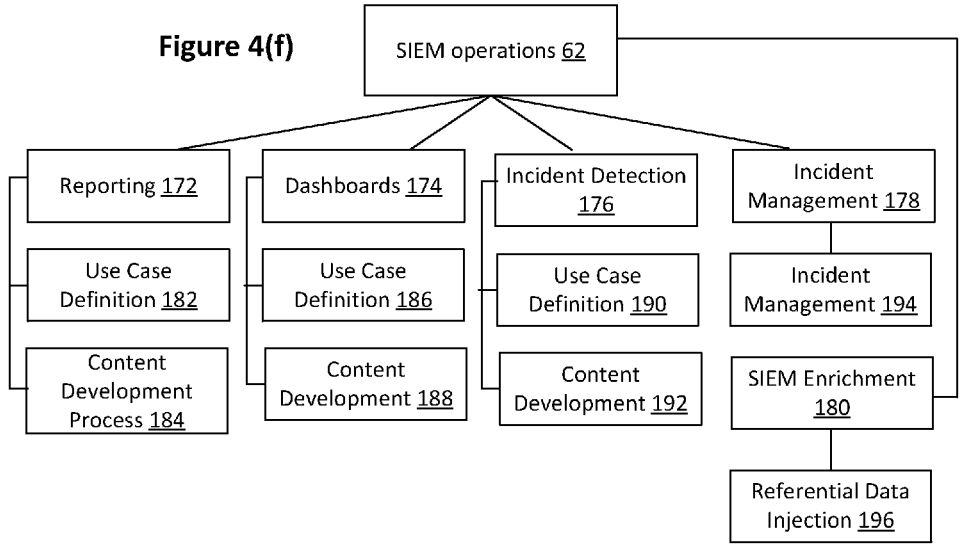

210

| Maturity | Definition |
|---|---|
| 0 | Non-Existent |
| 1 | Initial/Ad-Hoc |
| 2 | Repeatable but Intuitive |
| 3 | Defined Process |
| 4 | Managed and Measureable |
| 5 | Optimized |

FRAMEWORK FOR IMPLEMENTING SECURITY INCIDENT AND EVENT MANAGEMENT IN AN ENTERPRISE

BACKGROUND

Security incident and event management (SIEM) consists of infrastructure that includes software and hardware configured to provide real-time detection and alerting of security-related incidents on a network through collection of information and events. An example SIEM is RSA enVision™, a product of EMC Corp. of Hopkinton, Mass.

Enterprises implement SIEM in order to manage events such as requests for access to resources on their network. Conventional SIEM implementation approaches involve a SIEM vendor or user installing security SIEM infrastructure for an enterprise client in order to provide information security to the client. For example, a SIEM user may generate, as solutions posed by information security problems, basic reports and alerts; the user may then treat the solutions as a turnkey software application.

SUMMARY

Unfortunately, there are deficiencies with the above-described SIEM implementation approaches. For example, due to the complexity of SIEM, such approaches for clients that do not have proper skills or capital will likely result in an ineffective SIEM program and consequently unhappy clients.

In contrast to conventional SIEM implementation approaches which carry significant risk of program ineffectiveness, an improved technique involves verifying whether a client has proper resources to successfully implement SIEM infrastructure according to a SIEM maturity evaluation metric. Along these lines, a SIEM readiness evaluation program produces a SIEM maturity result that indicates whether the client has proper resources to successfully implement SIEM infrastructure on a network. For example, the SIEM maturity result indicates whether there are enough people having a certain skill set within the enterprise to properly react to events in an event log to which SIEM software writes. When the SIEM maturity result indicates that the client has proper resources, then the program installs the SIEM infrastructure on the network. Otherwise, the program delays such an installation to allow the enterprise time to acquire the proper resources.

Advantageously, the improved technique results in predictable level of success in implementing SIEM infrastructure for a client. Because the SIEM maturity evaluation program is the same for any client and is based on a maturity model such as the Capability Maturity Model®, it is an objective measure of a client's ability to successfully employ SIEM infrastructure in detecting and responding to incidents on the client's network.

One embodiment of the improved technique is directed to a method of providing SIEM infrastructure in a computer networking environment of a client, the SIEM infrastructure being constructed and arranged to monitor and record in an event log events within the computer networking environment, the SIEM infrastructure including i) software installed on a computer-readable medium that is configured to generate event log data and incident reports, and ii) hardware on which the software runs. The method includes performing, on a computer, a SIEM maturity evaluation operation that is configured to produce a SIEM maturity result indicative of whether the client has proper resources to achieve a successful implementation of the SIEM infrastructure on the computer networking environment, the successful implementation of the SIEM infrastructure enabling the client to react to events recorded in the event log. The method also includes performing an install operation on the SIEM infrastructure in the computer networking environment when the SIEM maturity result indicates that the client has the proper resources to successfully implement the SIEM infrastructure. The method further includes delaying the install operation on the SIEM infrastructure in the computer networking environment when the SIEM maturity result indicates that the client does not have the proper resources to successfully implement the SIEM infrastructure.

Additionally, some embodiments of the improved technique are directed to a computer program product having a non-transitory computer readable storage medium which stores code including a set of instructions to carry out the method of providing SIEM infrastructure in a computer networking environment of a client.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 4(a) is a tree diagram illustrating example subcomponents of a component shown in FIG. 3.

FIG. 4(b) is a tree diagram illustrating example subcomponents of a component shown in FIG. 3.

FIG. 4(e) is a tree diagram illustrating example subcomponents of a component shown in FIG. 3.

FIG. 4(f) is a tree diagram illustrating example subcomponents of a component shown in FIG. 3.

FIG. 5 is a table illustrating an example maturity model for use in evaluating a status of components and subcomponents shown in FIGS. 4(a)-(h).

DETAILED DESCRIPTION

An improved technique involves verifying whether a client has proper resources, processes, procedures and ability to successfully implement a SIEM solution according to a SIEM evaluation metric. Along these lines, a SIEM maturity evaluation program produces a SIEM maturity result that indicates whether the client has proper resources to successfully implement SIEM infrastructure on a network. For example, the SIEM readiness result indicates whether there are enough people having a certain skill set within the enterprise to properly react to events in an event log to which SIEM software writes. When the SIEM readiness result indicates that the client has proper resources, then the program installs the SIEM infrastructure on the network. Otherwise, the program delays such an installation to allow the enterprise time to acquire the proper resources Advantageously, the improved technique results in predictable level of success in implementing SIEM infrastructure for a client. Because the SIEM maturity evaluation program is the same for any client and is based on a maturity model such as the Capability Maturity Model®, it is an objective measure of a client's ability to successfully employ SIEM infrastructure in logging and responding to incidents on the client's network.

Figure 1:
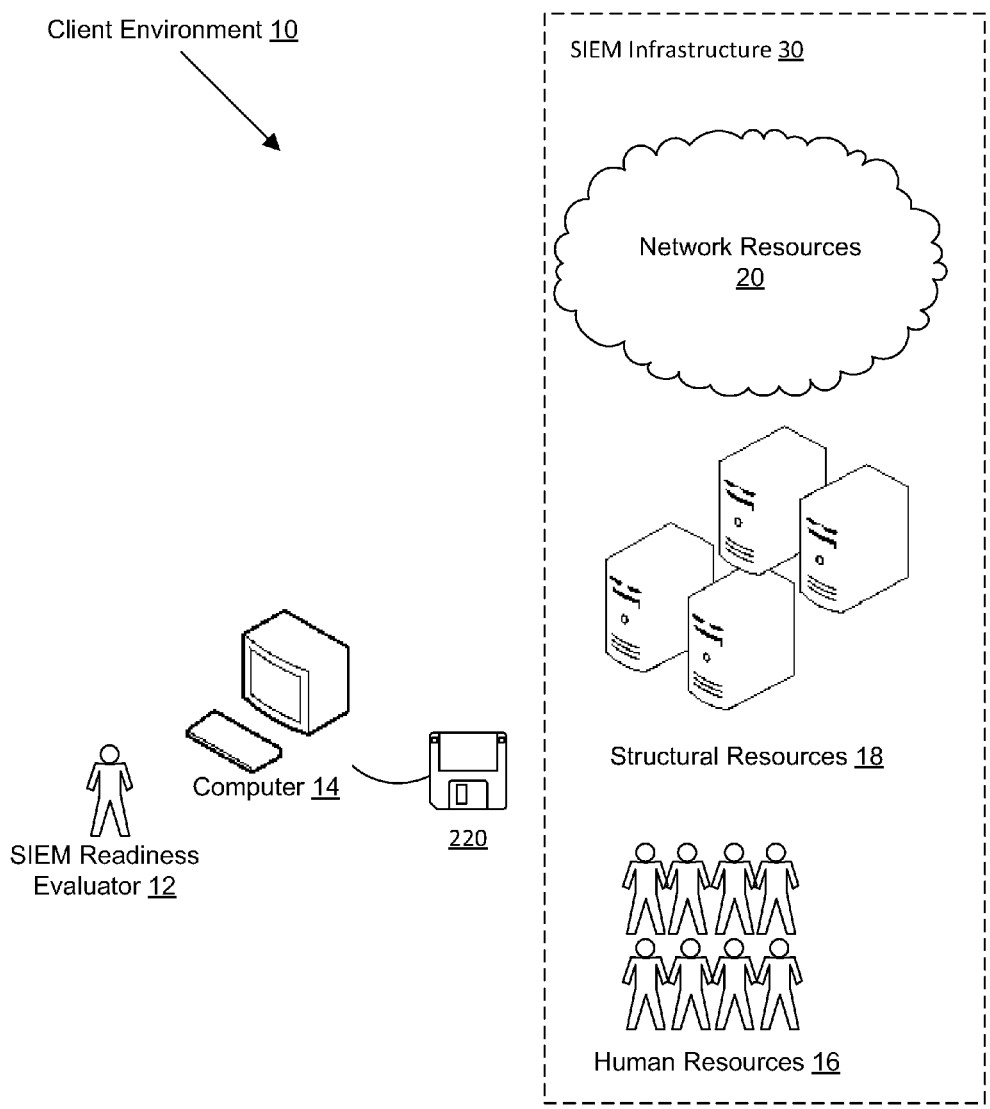
FIG. 1 is a block diagram illustrating an example electronic environment for carrying out the improved technique.

FIG. 1 illustrates an example client environment 10 for carrying out the improved technique. Example client environment 10 is an enterprise environment; in some arrangements, however, example client environment 10 is a small business or government environment. Client environment 10 includes computer 14 on which a SIEM maturity evaluation operation is performed and SIEM infrastructure 30, which in turn includes human resources 16, structural resources 18, and network resources 20.

Computer 14 is operated upon by SIEM maturity evaluator 12 and, in example client environment 10, a desktop computer configured to run a computer program product 220 that performs a SIEM maturity evaluation operation. In some arrangements, however, computer 14 is a laptop computer, a tablet computer, a netbook, a server, a smartphone, or a personal digital assistant.

It should be understood that computer program product 220 takes the form of a spreadsheet into which the information needed to generate the SIEM maturity result is input. In other arrangements, however, computer program product 220 can be a shell program, a database program, or generic mathematical software.

Human resources 16 include employees of the enterprise who are expected to perform day-to-day tasks in operating SIEM infrastructure 30. Such employees have various skills and levels of training that are useful in such day-to-day operation. For example, employees of human resources 16 include security architects, software architects, programmers, administrators, and the like.

Structural resources 18 include servers, computers, appliances, and other electronic hardware on which SIEM software runs. In some arrangements, structural resources 18 are dedicated appliances that connect to network resources 20 which in turn connect to a network.

Network resources 20 provide connections between the network (not pictured) and structural resources 18. Network resources 20 include routers, bridges, access points, gateway servers, wireless antennae, and cables used to connect structural resources 18 to the network.

During operation, SIEM maturity evaluator 12, in performing the SIEM maturity evaluation operation, makes assessments of the skills and levels of training of human resources 16 and the suitability of structural resources 18 and network resources 20. For example, SIEM maturity evaluator 12 assigns numerical scores to various attributes listed within a SIEM framework. Based on an aggregate score, SIEM maturity evaluator 12 decides whether to begin installation of SIEM infrastructure 30.

It should be understood that the SIEM maturity evaluation operation is a part of an overall SIEM implementation program that results in a full, customized SIEM solution for the enterprise. The SIEM maturity evaluation operation is the first phase of four phases in such a program. The second phase involves developing and publishing a SIEM deployment architecture. The third phase involves building, testing, and deploying the SIEM. The final phase involves maintaining the SIEM infrastructure during its operation.

Figure 2:
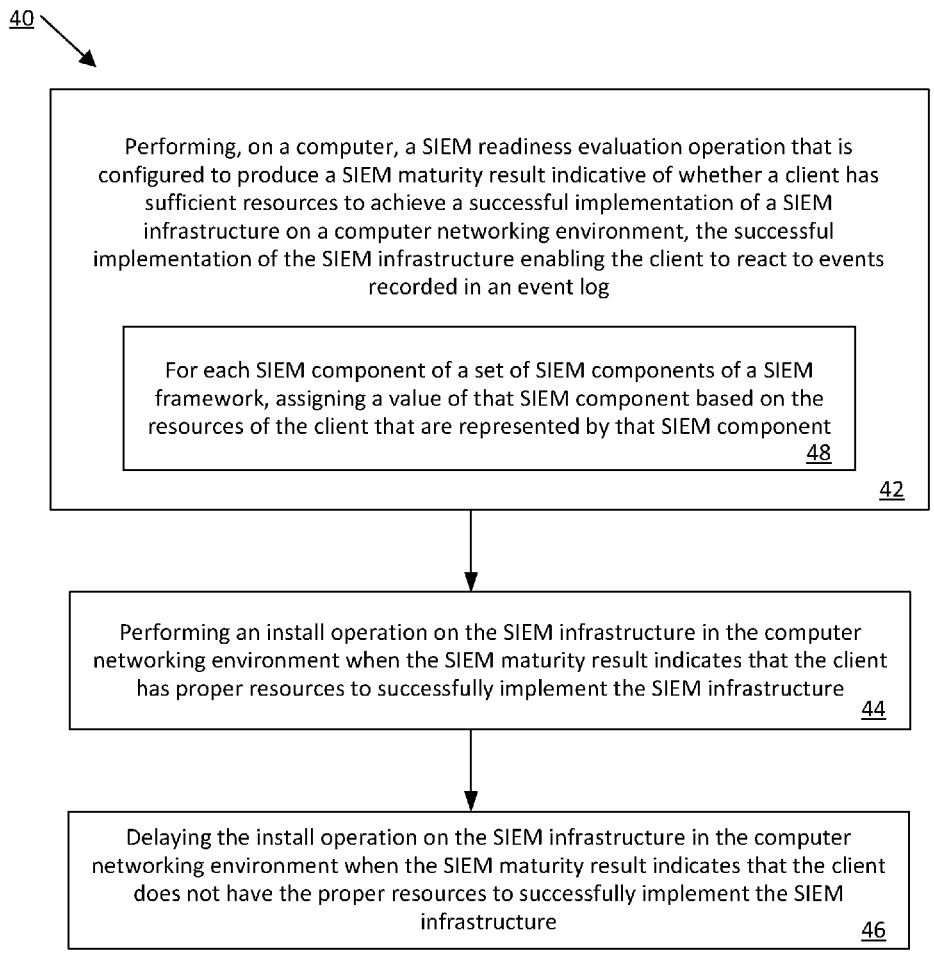
FIG. 2 is a flow chart illustrating an example method of carrying out the improved technique within the electronic environment shown in FIG. 1.

FIG. 2 illustrates a method 40 of providing SIEM infrastructure in a computer networking environment of a client. In step 42, a SIEM maturity evaluation operation that is configured to produce a SIEM maturity result indicative of whether the client has proper resources to achieve a successful implementation of the SIEM infrastructure on the computer networking environment is performed on a computer by SIEM maturity evaluator 12, the successful implementation of the SIEM infrastructure enabling the client to react to events recorded in the event log. In step 44, an install operation on the SIEM infrastructure in the computer networking environment is performed by a SIEM administrator (not pictured) when the SIEM maturity result indicates that the client has the proper resources to successfully implement the SIEM infrastructure. In step 46, the install operation on the SIEM infrastructure in the computer networking environment is delayed by SIEM maturity evaluator 12 when the SIEM maturity result indicates that the client does not have the proper resources to successfully implement the SIEM infrastructure 30.

In some arrangements, step 42 includes a sub-step 48 in which, for each SIEM component of the set of SIEM components of the SIEM framework, the value of that SIEM component is assigned based on the resources of the client that are represented by that SIEM component.

Further details of an example SIEM framework are discussed below with respect to FIGS. 3 and 4(a)-(h).

Figure 3:
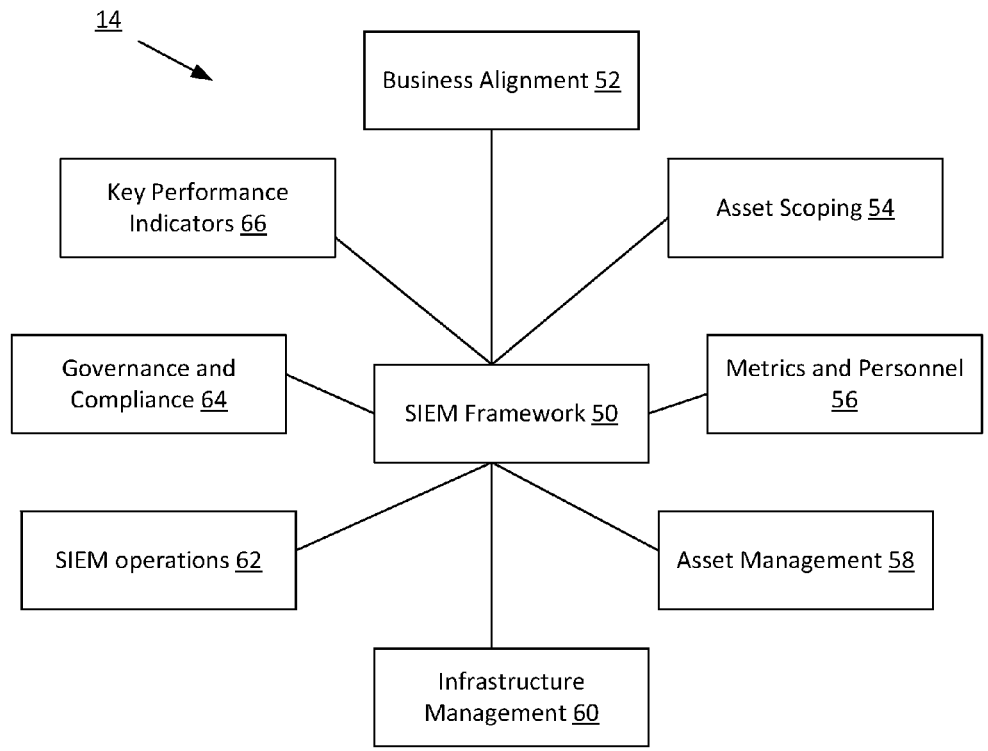
FIG. 3 is a block diagram illustrating an example SIEM framework and its constituent components, for use within the electronic environment of claim 1.

FIG. 3 illustrates an example SIEM framework 50 which forms the basis for the SIEM maturity evaluation operation. Along these lines, each component of SIEM framework 50 represents a distinct area of competency that SIEM maturity evaluator 12 measures through research at a client site. For example, SIEM maturity evaluator 12 assigns a score to each component of SIEM framework 50 based on a quality of the resources and processes involving those resources with respect to that component. Further details of the assignment of the score will be discussed below with respect to FIG. 5.

SIEM framework 50 includes eight components: business alignment 52, asset scoping 54, metrics & personnel 56, asset management 58, infrastructure management 60, SIEM operations 62, governance & compliance 64, and key performance indicators 66.

It should be understood that a decision to move beyond the first phase of the SIEM implementation program is based on an overall score aggregated from the scores associated with each of the eight components. In some arrangements, the overall score is an average of the scores associated with the eight components. In other arrangements, the overall score is a weighted average; in still other arrangements, the overall score is the minimum score associated with the eight components.

It should also be understood that the score associated with each component is an aggregate of scores associated with five categories: vision and strategy, people, infrastructure, management, and execution. In the vision and strategy category, SIEM maturity evaluator 12 assigns a score based on the quality of a plan for achieving the goals defined by the component. In the people category, SIEM maturity evaluator 12 assigns a score based on the knowledge of the subject matter defined by the component possessed by the stakeholders from human resources 16. In the infrastructure category, SIEM maturity evaluator 12 assigns a score based on the maturity of structural resources 18 and network resources 20 to satisfy the goals of the component. In the management category, SIEM maturity evaluator 12 assigns a score based on the quality of direction of human resources 16 in implementing processes that satisfy the goals of the component. In the execution category, SIEM maturity evaluator 12 assigns a score based on the quality of executing processes that satisfy the goals of the component. The score of the component, in some arrangements, is an average of the scores of each category.

Details concerning each of the eight components will be discussed below with respect to FIGS. 4(a)-4(h).

FIG. 4(a) illustrates details about the business alignment component 52 of SIEM framework 50. Business alignment component 52 involves an identification of the SIEM implementation program mission and stakeholders. Business alignment component 52 includes a mission statement subcomponent 70 and a key stakeholders subcomponent 72.

Mission statement subcomponent 70 involves an evaluation of the status of an identification of the overall goal of the SIEM implementation program. Key stakeholders subcomponent involves an evaluation of an identification of the people in human resources 16 who will be carrying out the various tasks for achieving the overall goal of the SIEM implementation program.

It should be understood that the score assigned to each of the categories of the subcomponents is, in some arrangements, based on a standard maturity model such as the Capability Maturity Model®. Further details of the Capability Maturity Model® are described below with respect to FIG. 5.

FIG. 5 illustrates the Capability Maturity Model® 210. Capability Maturity Model® 210 includes a maturity score 212, which is a number between 0 and 5, and a corresponding definition. A score of 0 implies that processes for completing tasks involved in a component or subcomponent are nonexistent. A score of 1 implies that processes that are configured to complete tasks involved in a component or subcomponent are initial or ad-hoc. A score of 2 implies that processes that are configured to complete tasks involved in a component or subcomponent are repeatable but intuitive. A score of 3 implies that processes that are configured to complete tasks involved in a component or subcomponent are defined. A score of 4 implies that processes that are configured to complete tasks involved in a component or subcomponent are managed and measureable. A score of 5 implies that processes that are configured to complete tasks involved in a component or subcomponent are optimized.

Returning to FIG. 4(a), mission statement subcomponent 70 includes the five categories described above. The vision and strategy category is scored a 1 when the enterprise has an idea what it wants to accomplish, a 2 when direct reports understand why their team exists, a 3 when there is a mission statement, a 4 when there is a year/quarter/monthly end reflection on the mission statement, and a 5 when there is continuous improvement focus. The people category is scored a 1 when the SIEM manager knows the mission statement, a 2 when the direct reports are able to recite the mission statement, a 3 when the direct reports are able to locate the mission statement, a 4 when there is dialog on the purpose of the mission statement, and a 5 when there is continuous improvement focus. The infrastructure category is scored a 1 when the mission statement is stored on local machines, a 2 when the mission statement is advertised on communications, a 3 when the mission statement is listed on team portal or team collaboration sites, a 4 when the mission statement is bannered on any documentation and or portals, and a 5 when people look to see if the mission statement can be placed on any other pieces of infrastructure. The management category is scored a 1 when management knows what mission statement is, a 2 when management took part in crafting missions statement, a 3 when management takes part in reviewing mission statement and or discussing it during meetings, a 4 when management is held accountable on the mission statement, and a 5 when management reflects on continuous improvement. The execution category is scored 0-5 based on the quality of the execution of the tasks in mission statement subcomponent 70.

Key stakeholders subcomponent 72 includes the five categories described above. The vision and strategy category is scored a 1 when the enterprise has an organizational chart, a 2 when there are defined leaders for each team, a 3 when there is a mapping to SIEM stakeholders from each team, a 4 when there is a review of key stakeholder involvement, and a 5 when there is a yearly strategy session for SIEM that involves key stakeholders. The people category is scored a 1 when there are names attached to stakeholders, a 2 when the teams are aware of their role, a 3 when there is a decision on who is a key stakeholder, a 4 when key stakeholders are communicated and held accountable, and a 5 when each team is represented by a key stakeholder. The infrastructure category is scored a 1 when the key stakeholders are documented via email, a 2 when an organizational chart exists with key stakeholders identified, a 3 when automation is considered for key stakeholder participation, a 4 when there is a failsafe mechanism for accountability, and a 5 when there are layers of protection and mature infrastructure. The management category is scored a 1 when management is aware of responsibilities within SIEM, a 2 when management signs off on key stakeholders, a 3 when management is made aware when key stakeholders do not show, a 4 when key stakeholders' attendance is taken during regular meetings, and a 5 when key stakeholders regularly communicate back to management. The execution category is scored 0-5 based on the quality of the execution of the tasks in key stakeholders subcomponent 72.

FIG. 4(b) illustrates details about the asset scoping component 54 of SIEM framework 50. Asset scoping component 54 involves an identification of event sources, locations, and groupings. Asset scoping component 54 includes an asset sources subcomponent 74, an asset locations subcomponent 76, and an asset grouping subcomponent 78.

Asset sources subcomponent 74 includes a platforms-in-scope subcomponent 80, an applications-in-scope subcomponent 82, and a physical assets in-scope subcomponent 84. Asset locations subcomponent 76 includes location of assets definition subcomponent 86 and remote assets subcomponent 88. Asset grouping subcomponent 78 includes divisional subcomponent 90, geographical subcomponent 92, network segmentation subcomponent 94, compliance subcomponent 96, platforms subcomponent 98, asset risk subcomponent 100, and business function subcomponent 102.

Platforms-in-scope subcomponent 80, applications-in-scope subcomponent 82, and physical assets in-scope subcomponent 84 each include the five categories described above. The vision and strategy category is scored a 1 when the asset type is identified within the enterprise, a 2 when a conscious decision has been made to log or not to log the asset type, a 3 when a team collectively decides to form a logging strategy for the asset, a 4 when the strategy is communicated through organization as the strategy on logging, and a 5 when asset logging is regularly reviewed and updated. The people category is scored a 1 when someone knows the asset scope, a 2 when key stakeholders know the logging scope for the unique asset, a 3 when the SIEM team knows the asset scope, a 4 when anybody within the organization can effectively communicate the asset scope for this asset type, and a 5 when others provide feedback to the asset scope. The infrastructure category is scored a 1 when logging is discussed during asset discussions, a 2 when some sort of documented procedure exists to log or monitor the asset type, a 3 when there is an automated workflow to determine if the asset is in scope, a 4 when there is reporting on an asset scope change, and a 5 when there is capacity planning as well as reflection and trending on asset scope type. The management category is scored a 1 when management is aware of asset type logging, a 2 when management decides whether to mandate logging asset type, a 3 when management approval exists for logging asset type, a 4 when management is given the report on which assets are in scope, and a 5 when there is a review of asset scope changes from management. The execution category is scored 0-5 based on the quality of the execution of the tasks.

Location of assets definition subcomponent 86 includes the five categories described above. The vision and strategy category is scored a 1 when there is awareness of the location of assets, a 2 when asset locations have nicknames, a 3 when there is an asset location definition, a 4 when the asset locations have naming conventions, and a 5 when any asset can be identified via a CMDB/naming convention where it lives. The people category is scored a 1 when long-term employees know where the assets live, a 2 when there is a clear strategy on assets in datacenters, a 3 when all IT members are able to discuss asset locations, a 4 when communication regarding where all assets are located is established, and a 5 when there is continuous improvement and cross training on asset locations. The infrastructure category is scored a 1 when there is tribal knowledge of asset locations, a 2 when an asset naming convention exists, a 3 when location grouping in asset types exists, a 4 when automatic location of assets is appended to a hostname, and a 5 when a domain name server (DNS) is properly configured for asset location. The management category is scored a 1 when management is able to decipher location of assets in general, a 2 when management knows all locations of assets, a 3 when management can point to where each asset lives, a 4 when management has clear control and direction on asset location and placement, and a 5 when assets are managed by management, who are able to produce reports on the locations in which assets are located. The execution category is scored 0-5 based on the quality of the execution of the tasks.

Remote assets subcomponent 88 includes the five categories described above. The vision and strategy category is scored a 1 when there are remote assets accounted for, a 2 when there is a separate security policy for remote assets, a 3 when security monitoring/logging is discussed within that security policy, a 4 when there is clear direction and strategy for remote assets, and a 5 when staff is constantly looking at ways to improve security for remote assets. The people category is scored a 1 when the SIEM team is made aware of remote assets, a 2 when the SIEM team is capable of discussing logging strategy of SIEM assets, a 3 when the SIEM team communicates remote logging strategy to other parties inside the enterprise, a 4 when regular communication occurs regarding logging strategy of remote assets, and a 5 when there is frequent security training about remote users. The infrastructure category is scored a 1 when remote assets that need to be logged are declared, a 2 when assets are defined as remote, a 3 when a process is in place to log or monitor remote assets, a 4 when reports of assets that do not report from the field are available, and a 5 when reports or automation exists to ensure compliance of logging remote assets. The management category is scored a 1 when management is aware of remote assets, a 2 when management is able to declare what data is outside their control, a 3 when there is increased security for remote assets, a 4 when management tracks remote assets, and a 5 when there is continuous enhancement and review of remote asset strategy. The execution category is scored 0-5 based on the quality of the execution of the tasks.

Divisional subcomponent 90, geographical subcomponent 92, network segmentation subcomponent 94, and platforms subcomponent 98 include the five categories described above. The vision and strategy category is scored a 1 when the enterprise understands a need to logically separate assets, a 2 when an ad-hoc process is developed a 3 when a naming convention exists, a 4 when automation is documented, and a 5 when the staff is confident that assets are automatically tagged via a documented process. The people category is scored a 1 when the SIEM staff understands the need for groups, a 2 when the SIEM staff is able to logically pick assets that belong to each group, a 3 when the SIEM staff understands the unique identifiers that separate assets, a 4 when the SIEM staff us able to speak to automation and communicate how assets are dynamically grouped together, and a 5 when end users in the enterprise understand how assets are organized. The infrastructure category is scored a 1 when SEM users select groups statically, a 2 when SIEM users select groups ad-hoc or reference specific hosts for grouping, a 3 when a level of automation or dynamic grouping occurs, a 4 when an automated process exists for the asset to enter into the device group or filter, and a 5 when the dynamic group is automatically updated and a mechanism is in place to check to ensure assets are placed correctly. The management category is scored a 1 when management is aware of the need to group assets together, a 2 when management is able to decipher how assets should be grouped, a 3 when management took part in a grouping exercise, a 4 when reporting exists for total assets in each group type, and a 5 when assets is fully aware of device groups and are able to repeat them. The execution category is scored 0-5 based on the quality of the execution of the tasks.

Compliance subcomponent 96 includes the five categories described above. The vision and strategy category is scored a 1 when the enterprise understands a need to logically separate assets, a 2 when an ad-hoc process is developed a 3 when a naming convention exists, a 4 when automation is documented, and a 5 when the staff is confident that assets are automatically tagged via a documented process. The people category is scored a 1 when someone is able to decipher which asset is needed for compliance, a 2 when the SIEM team is able to locate documents or policy mandating log collection group, a 3 when there is an automated grouping for compliance tagged assets, a 4 when the scope for compliance required assets change inline with the grouping, and a 5 when all persons are aware of compliance requirements and understand grouping required. The infrastructure category is scored a 1 when there is a way to differentiate between assets for this type of group, a 2 when the asset group is a static group inside the SIEM tool, a 3 when the asset group is a dynamic group inside the SIEM tool, a 4 when the dynamic group is automatically updated when a new asset comes into the system, and a 5 when the dynamic group is automatically updated and a mechanism is in place to check to ensure assets are placed correctly. The management category is scored a 1 when management is able to decipher compliance and meaning of grouping, a 2 when management knows all compliance assets, a 3 when management can point to where each asset is stored, a 4 when management has clear control and direction on compliance requirements and which assets are where, and a 5 when assets are managed by management and able to produce reports on which location assets live. The execution category is scored 0-5 based on the quality of the execution of the tasks.

Asset risk subcomponent 100 includes the five categories described above. The vision and strategy category is scored a 1 when the enterprise understands that one asset is more important than another, a 2 when some vision exists on how to determine importance of server basic functions, a 3 when a strategy exists for assigning risk to an asset, a 4 when the strategy is well laid out, and a 5 when a feedback loop exists and asset risk plan is documented. The people category is scored a 1 when the SIEM staff understands the importance of one asset over another, a 2 when the enterprise understands the importance of asset risk, a 3 when the SIEM team is able to determine asset risk ad-hoc, a 4 when the SIEM team monitors automated asset risk assigning and provides reporting capabilities, and a 5 when there is a continual look to optimize asset risk scoring and accuracy. The infrastructure category is scored a 1 when there is an ad-hoc set of attributes to assign risk, a 2 when an ad-hoc risk mapping exists, a 3 when an automated risk assignment process exists, a 4 when the defined process exists as well as reporting exists for the risk assignments, and a 5 when trending and automated responses are built into reports and alerts align with risk scores. The management category is scored a 1 when management is aware of the asset risk idea, a 2 when management assists in driving risk policy, a 3 when management contributes to risk policies, a 4 when management closely monitors and assigns various degrees of risk, and a 5 when risk policy for enterprise closely aligns with risk assigned to various assets and groups. The execution category is scored 0-5 based on the quality of the execution of the tasks.

Business function subcomponent 102 includes the five categories described above. The vision and strategy category is scored a 1 when the enterprise understands a need to logically separate assets, a 2 when an ad-hoc process is developed a 3 when a naming convention exists, a 4 when automation is documented, and a 5 when the staff is confident that assets are automatically tagged via a documented process. The people category is scored a 1 when the SIEM staff understands the need for groups, a 2 when the SIEM staff is able to logically pick assets that belong to each group, a 3 when the SIEM staff understands the unique identifiers that separate assets, a 4 when the SIEM staff us able to speak to automation and communicate how assets are dynamically grouped together, and a 5 when end users in the enterprise understand how assets are organized. The infrastructure category is scored a 1 when there is a way to differentiate between assets for this type of group, a 2 when the asset group is a static group inside the SIEM tool, a 3 when the asset group is a dynamic group inside the SIEM tool, a 4 when the dynamic group is automatically updated when a new asset comes into the system, and a 5 when the dynamic group is automatically updated and a mechanism is in place to check to ensure assets are placed correctly. The management category is scored a 1 when management is aware of the need to group assets together, a 2 when management is able to decipher how assets should be grouped, a 3 when management took part in a grouping exercise, a 4 when reporting exists for total assets in each group type, and a 5 when assets is fully aware of device groups and are able to repeat them. The execution category is scored 0-5 based on the quality of the execution of the tasks.

Figure 4C:
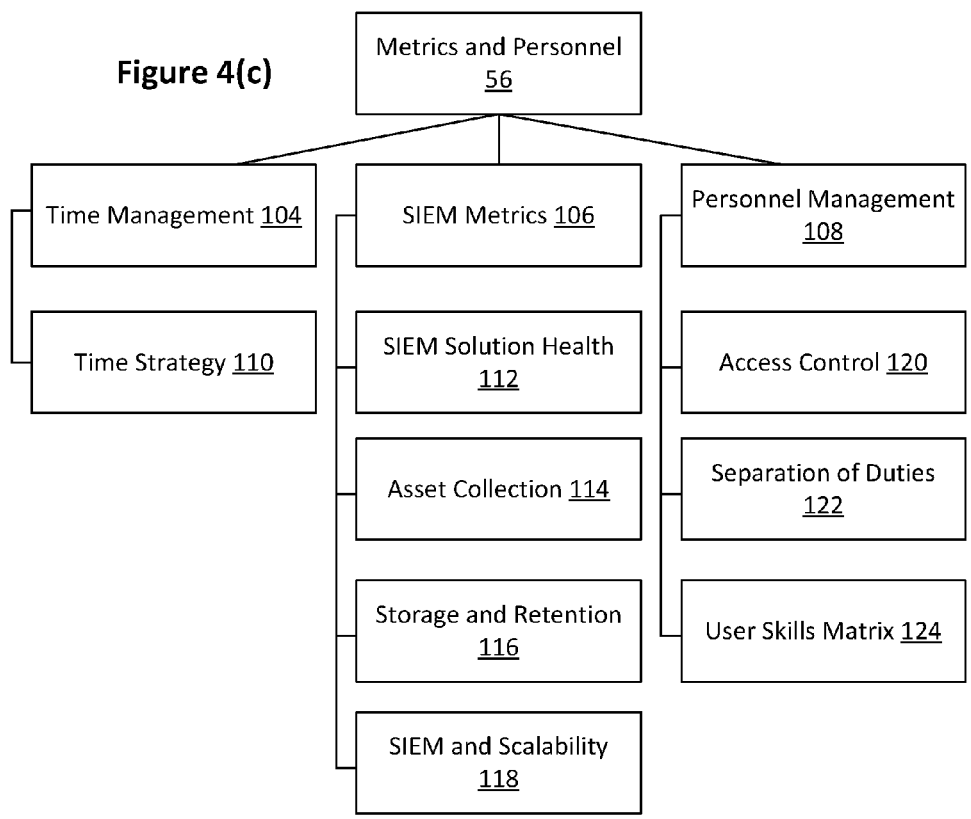
FIG. 4(c) is a tree diagram illustrating example subcomponents of a component shown in FIG. 3.

FIG. 4(c) illustrates details about the metrics and personnel component 56 of SIEM framework 50. Metrics and personnel component 56 includes time management subcomponent 104, a SIEM metrics subcomponent 106, and a personnel management subcomponent 108.

Time management subcomponent 104 includes a time strategy subcomponent 110. SIEM metrics subcomponent 106 includes SIEM solution health subcomponent 112, an asset collection subcomponent 114, a storage and retention subcomponent 116, and a SIEM and scalability subcomponent 118. Personnel management subcomponent 108 includes access control subcomponent 120, separation of duties subcomponent 122, and user skills matrix subcomponent 124

Time strategy subcomponent 110 includes the five categories described above. The vision and strategy category is scored a 1 when time strategy has been thought about, a 2 when there is a consistent message about time, a 3 when there is a documented time strategy, a 4 when there is a documented and published time strategy, and a 5 when the time strategy is continuously reviewed and enhanced via DR/HA drills. The people category is scored a 1 when anybody is able to discuss the time strategy, a 2 when the SIEM staff are aware of the time strategy, a 3 when all persons are aware of the NTP server and to where infrastructure points, a 4 when communication exists to reinforce administrators to ensure time is accurate, and a 5 when time strategy is regularly communicated, tested, and discussed. The infrastructure category is scored a 1 when the NTP server is at least internal or using an external source, a 2 when time is kept via internal NTP server, a 3 when NTP is kept on multiple servers synced to a single authorities source, a 4 when NTP is monitored and verified via management protocol, and a 5 when time is accurate and routinely tested and verified with DR/HA policies existing for time within the organization. The management category is scored a 1 when time is considered a talking point within management, a 2 when management has a documented policy they can reference, a 3 when management has a policy to enforce, a 4 when time is audited to ensure policy is being enforced, and a 5 when time is audited, centrally controlled, and established within the organization. The execution category is scored 0-5 based on the quality of the execution of the tasks.

SIEM solution health subcomponent 112 includes the five categories described above. The vision and strategy category is scored a 1 when SIEM health has been considered, a 2 when there is a verbal strategy on how one considers SIEM health, a 3 when there is a strategy in place to monitor SIEM health, a 4 when there is a defined strategy documented on how to monitor SIEM health, and a 5 when the strategy is routinely audited. The people category is scored a 1 when SIEM administrators check the SIEM health manually, a 2 when the SIEM administrators follow a document to check SIEM health, a 3 when SIEM administrators understand bad and good SIEM health, a 4 when SIEM administrators have accountability to check to ensure SIEM health, and a 5 when a documented SIEM health check exists. The infrastructure category is scored a 1 when there is a manual check on SIEM health, a 2 when there are documented procedures on SIEM health, a 3 when some sort of alert-based checking of SIEM health, a 4 when SIEM health is monitored by a third party agent and tracked in real time, and a 5 when daily and weekly reports exist that are routinely reviewed and optimized. The management category is scored a 1 when management understands the need to monitor SIEM health, a 2 when management allows resources for checking SIEM health, a 3 when management takes part in reviewing SIEM health, a 4 when management is delivered reports on trends and a 5 when management enhances reports and has yearly reviews. The execution category is scored 0-5 based on the quality of the execution of the tasks.

Asset collection subcomponent 114 includes the five categories described above. The vision and strategy category is scored a 1 when the idea of understanding how many assets coming in is important, a 2 when there is a business use case on understanding asset metrics, a 3 when there is a clear direction on requirements that need to be provided to supplement the enterprise charter, a 4 when there are metrics of collection capabilities available to other parts of the organization, and a 5 when the SIEM metrics regarding collection is advertised to the enterprise. The people category is scored a 1 when the SIEM team knows where to get required metrics, a 2 when the SIEM team knows about which metrics are important, a 3 when asset collection metrics are routinely reviewed by the SIEM team, a 4 when key stakeholders are aware of asset collection metrics, and a 5 when each division or key stakeholder representation is aware of localized asset collection metrics. The infrastructure category is scored a 1 when asset collection metrics are gathered ad-hoc, a 2 when asset collection metrics are built using ad-hoc manual processes, a 3 when asset collection metrics are automated using scripts, a 4 when asset collection metrics are automated and distributed automatically for consumption by key stakeholders, and a 5 when asset collection metrics are automated, distributed, and trended over periods of time. The management category is scored a 1 when management is aware of the importance of asset collection metrics, a 2 when management allows resources for provide such a service, a 3 when management takes part in receiving asset collection metrics, a 4 when management enforces review of asset metrics and key stakeholder involvement and a 5 when management monitors asset collection metrics. The execution category is scored 0-5 based on the quality of the execution of the tasks.

Storage and retention subcomponent 116 includes the five categories described above. The vision and strategy category is scored a 1 when there is an awareness of storage growth and capacity, a 2 when the enterprise has an idea of storage growth and requirements, a 3 when storage growth is calculated loosely, a 4 when storage capacity has been documented, discussed, and referenced back to policy, and a 5 when the enterprise routinely is communicated to regarding policies, capacity growth, and requirements. The people category is scored a 1 when the SIEM team is aware of storage capacity and retention need, a 2 when the SIEM team is capable of discussing total storage size, a 3 when the SIEM team is capable of producing location requirements and there is a reference to requirements on storage/retention, a 4 when purpose driven storage requirements exist, and a 5 when there is a yearly review on storage requirements and a legal audit has been signed off on. The infrastructure category is scored a 1 when total storage is documented and is not past 80% capacity, a 2 when storage requirements and retention are documented, a 3 when an automated retention script exists, a 4 when there are automated methods to handle retention with reporting capability, and a 5 when storage is monitored by multiple layers. The management category is scored a 1 when management is aware of storage capacity, a 2 when management has asked for storage capacity and ETA for exhaustion, a 3 when management has storage policies in place, a 4 when management has policies audited, and a 5 when management is delivered reports on compliance, retention, and capacity. The execution category is scored 0-5 based on the quality of the execution of the tasks.

SIEM and scalability subcomponent 118 includes the five categories described above. The vision and strategy category is scored a 1 when there is an awareness of scalability, a 2 when there have been discussions around growth or scalability, a 3 when there is a regular meeting that takes place to discuss scalability, a 4 when there is trending or reporting that enables for planning the strategy, and a 5 when frequent capacity planning and scalability meetings takes place. The people category is scored a 1 when the SIEM team understands SIEM metrics, a 2 when someone reviews metrics regularly, a 3 when someone else reviews metrics when the usual person is gone, a 4 when there is an automated system to review metrics, and a 5 when metrics are consistently being reviewed. The infrastructure category is scored a 1 when there is an ad-hoc manual check to review scalability requirements, a 2 when basic scalability metrics such as device count and pending integrations exist, a 3 when some form of automation exists to check scalability considerations, a 4 when alerting and reporting exists for scalability concerns, and a 5 when there is automation of alert notification and trending reports. The management category is scored a 1 when management is aware of capacity planning and scaling, a 2 when management is involved in decisions regarding scaling, a 3 when management receives reports on scalability and trending, a 4 when management mandates capacity planning sessions, and a 5 when management takes part of annual scalability meetings and is fully aware of growth situations. The execution category is scored 0-5 based on the quality of the execution of the tasks.

Access control subcomponent 120 includes the five categories described above. The vision and strategy category is scored a 1 when there is an awareness of access control, a 2 when there have been discussions around access control strategy, a 3 when SIEM specific access control strategy is in place and enforced, a 4 when access to SIEM is programmatic, and a 5 when access to SIEM is programmatic and aligns with enterprise policies and procedures. The people category is scored a 1 when the SIEM administrators are aware of capabilities that people have inside the SIEM, a 2 when access control to the SIEM is discussed, a 3 when users are aware of role based access inside the SIEM, a 4 when role based access is audited, and a 5 when roles are clearly defined and audited. The infrastructure category is scored a 1 when users manually determine what to do or not to do inside SIEM, a 2 when user roles are defined within the SIEM, a 3 when users are mapped to user groups, a 4 when granular controls are mapped to user groups, and a 5 when there is an automated process to map permissions to groups. The management category is scored a 1 when management understands the need to control access to the SIEM, a 2 when management approves verbally who can access the SIEM, a 3 when management has some document to grant access, a 4 when management is notified via an automated system, and a 5 when management has multiple layers of approval. The execution category is scored 0-5 based on the quality of the execution of the tasks.

Separation of duties subcomponent 122 includes the five categories described above. The vision and strategy category is scored a 1 when a basic vision exists on separating out duties in order to protect the enterprise, a 2 when the vision is documented, a 3 when the vision aligns with some form of compliance, a 4 when separation is well communicated and documented, and a 5 when separation aligns with best in class. The people category is scored a 1 when all parties know what they can and cannot do based on separation of duties, a 2 when people are tagged in some way inside the SIEM system on their role, a 3 when the SIEM team is aware of the separation of duties and its role in improving the enterprise, a 4 when checks are done to ensure user groups that are populated are accurate, and a 5 when automation of users requesting roles exists. The infrastructure category is scored a 1 when manual duties are assigned to each person, a 2 when a basic user is assigned permissions to complete certain tasks and not others, a 3 when user groups exist and a basic form of role based access is within SIEM, a 4 when role based access is tightly controlled, and a 5 when there is an audit to ensure that users are placed inside each role correctly. The management category is scored a 1 when management is aware of the importance of separating roles, a 2 when management mandates the need to separate duties, a 3 when management has a documented procedure or roles that people need to fulfill, a 4 when management approves duties assigned to users, and a 5 when management receives reporting on user roles. The execution category is scored 0-5 based on the quality of the execution of the tasks.

User skills matrix subcomponent 124 includes the five categories described above. The vision and strategy category is scored a 1 when SIEM skills have been discussed, a 2 when SIEM skills have been mapped to job profile, a 3 when a vision is in place on how to staff SIEM, a 4 when the enterprise has defined job profiles and can accurately replace or hire accordingly, and a 5 when SIEM required skills are documented and align with best practices. The people category is scored a 1 when the SIEM team is capable of staffing appropriate roles, a 2 when staff is competent in administering SIEM, a 3 when the staff is capable of running SIEM, a 4 when training is provided to staff on SIEM skills annually, and a 5 when training plan and feedback is prepared and SIEM staff is competent to complete any SIEM task. The infrastructure category is scored a 1 when job skillsets are documented, a 2 when skill sets can be improved via lab or test equipment, a 3 when skills are mapped to specific capabilities that can be tested or verified, a 4 when SIEM skills are validated when hiring staff, and a 5 when growth of user skill sets exists. The management category is scored a 1 when management is aware of the requirement to define user skill sets, a 2 when user skill sets map to job profiles in human resources, a 3 when management can validate user skill sets and document job profiles, a 4 when management allows resources to grow staff capabilities, and a 5 when management sets aside budget to enhance user skill sets, staffing predictions, and capability to replace via documented procedure. The execution category is scored 0-5 based on the quality of the execution of the tasks.

Figure 4D:
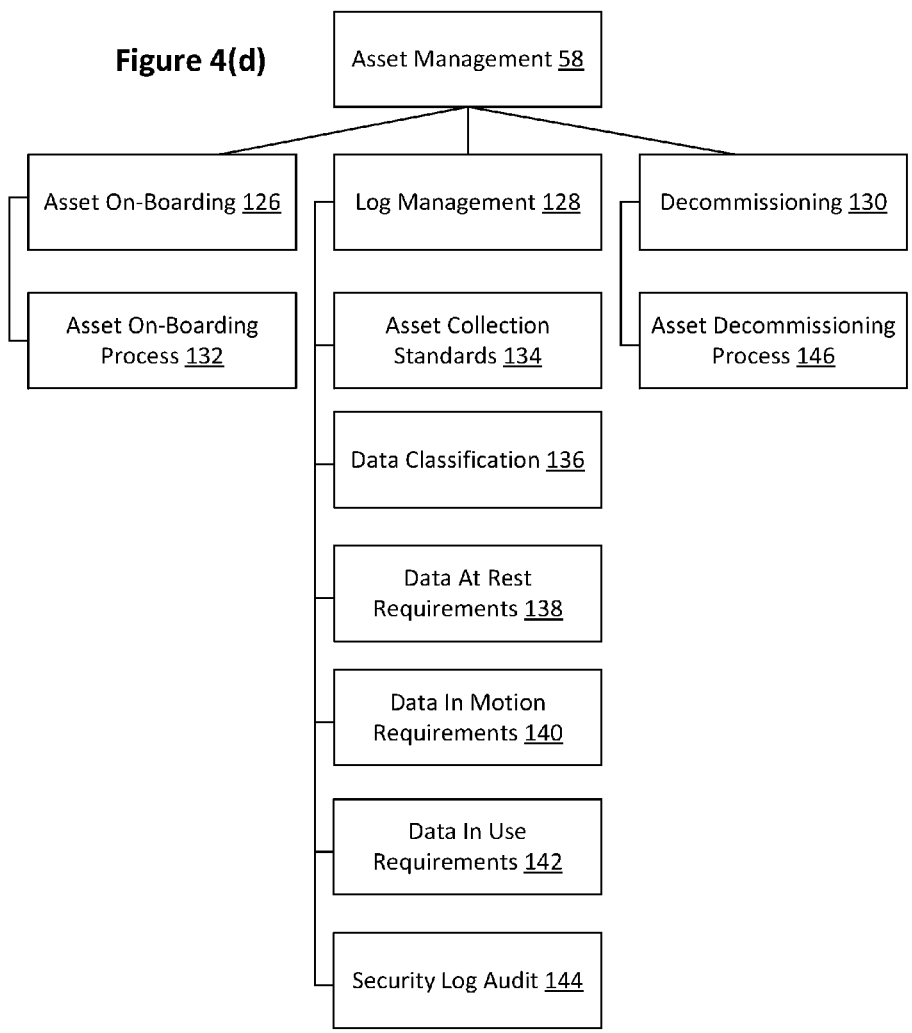
FIG. 4(d) is a tree diagram illustrating example subcomponents of a component shown in FIG. 3.

FIG. 4(d) illustrates details about the asset management 58 of SIEM framework 50. Asset management component 58 includes an asset on-boarding subcomponent 126, a log management subcomponent 128, and a decommissioning subcomponent 130.

Asset on-boarding subcomponent 126 includes an asset on-boarding process subcomponent 132. Log management subcomponent 128 includes an asset collection standards subcomponent 134, a data classification subcomponent 136, a data at rest requirements subcomponent 138, a data in motion requirements subcomponent 140, a data in use requirements subcomponent 142, and a security log audit subcomponent 144. Decommissioning subcomponent 130 includes asset decommissioning process subcomponent 146

Asset on-boarding process subcomponent 132 includes the five categories described above. The vision and strategy category is scored a 1 when a need for asset integration collateral has been established, a 2 when a formal understanding and concept of repeatability exists and has been verbally discussed, a 3 when a procedure & policy has been requested for asset on-boarding, a 4 when a P & P is defined rolling into a strategy overall for handling assets, and a 5 when the P & P is reviewed and enhanced from feedback and annual review. The people category is scored a 1 when SIEM people know that assets need to be cared for, a 2 when the SIEM staff have an ad-hoc responsibility to integrate, a 3 when SIEM people understand an automated process exists and take part in it, a 4 when SIEM people contribute to the automated process, and a 5 when SIEM people only review trending and reports as automation and feedback exists. The infrastructure category is scored a 1 when manual adding of assets is kept current, a 2 when a policy or procedure exists on how to add devices, a 3 when administrator and SIEM team have documented procedures for adding assets, a 4 when automated procedures to add assets exists that is capable of reporting/tracking assets, and a 5 when asset on-boarding trending capability exists. The management category is scored a 1 when management is aware of assets needing to be incorporated, a 2 when management is aware of repeatability, a 3 when management is involved in helping automation to set standards, a 4 when management has a way to track new devices, and a 5 when management reviews asset on-boarding P & P. The execution category is scored 0-5 based on the quality of the execution of the tasks.

Asset collection standards subcomponent 134 includes the five categories described above. The vision and strategy category is scored a 1 when a vision exists to set log collection standards, a 2 when a vision has been verbally discussed, a 3 when a strategy exists on how to collect all information within the enterprise, a 4 when there is a documented vision on standards for log collection, and a 5 when asset collection standards are reviewed yearly and determined best of breed approach. The people category is scored a 1 when someone knows about the consistent plan on collecting information, a 2 when some people know and understand the importance of central log management, a 3 when people are able to communicate to end users about the definition of log collection and integration methods, a 4 when there is regular communication for collection standards and types, and a 5 when users always refer back to the capabilities and collection types the enterprise has defined. The infrastructure category is scored a 1 when a how-to document exists on how logs are collected, a 2 when a published document exists within the internal organization on protocol and log management integrations, a 3 when people are automatically forced to configure their devices according to collection standards, a 4 when end users are ensured of following collection standards, and a 5 when all key stakeholders sign off and approve. The management category is scored a 1 when management is aware of need to have consistency in collection integrations, a 2 when management enforces users to integrate to ensure compliance with enterprise objectives, a 3 when management is involved in key decisions through some document, a 4 when management communicates to business the standards that the SIEM team can collect logs and defines them to fellow management, and a 5 when management and key stakeholders look for optimization and review annually. The execution category is scored 0-5 based on the quality of the execution of the tasks.

Data classification subcomponent 136 includes the five categories described above. The vision and strategy category is scored a 1 when there is recognition that log could contain sensitive information, a 2 when a conscious effort has been made to determine whether logs should be viewed by certain people, a 3 when a data classification policy exists within the organization, a 4 when management approves the vision and strategy, and a 5 when data classification policy is applicable and applied to the SIEM. The people category is scored a 1 organizational awareness of sensitive data exists, a 2 when data classification and sensitivity exists within a security team, a 3 when someone knows about the data classification policy and how it applies to SIEM, a 4 when there are controls or checks on classification of data sets, and a 5 when the enterprise continues to improve data classification through log separation. The infrastructure category is scored a 1 when some form of data classification exists within the enterprise, a 2 when some form of data classification exists within SIEM, a 3 when data classification determines transport protocol, a 4 when a technical audit is in place to ensure that collection of sensitive data is protected, and a 5 when the enterprise is capable of reporting on sensitive log information. The management category is scored a 1 when management is aware of data classification policy within the enterprise, a 2 when management has applied data classification requirements to SIEM and log management properties, a 3 when management enforces and follows data classification policy, a 4 when management is able to repeat how the data is classified within SIEM, and a 5 when management documents and publishes data classification. The execution category is scored 0-5 based on the quality of the execution of the tasks.

Data at rest requirements subcomponent 138 includes the five categories described above. The vision and strategy category is scored a 1 when there is recognition that logs at rest are or are not protected, a 2 when a conscious effort has been made to determine whether logs need to be protected, a 3 when a requirement states that raw information should or should not be protected, a 4 when data at rest strategy exists and is verbally communicated, and a 5 when data at rest strategy is in place. The people category is scored a 1 when organizational awareness of sensitive data exists, a 2 when data at rest is communicated that it meets enterprise requirements, a 3 when someone knows about the data classification policy and how it applies to SIEM, a 4 when there are controls or checks on classification of data sets, and a 5 when the enterprise continues to improve data classification through log separation. The infrastructure category is scored a 1 when data is protected by limited access to the data at rest, a 2 when data is protected in some form from end users accessing it, a 3 when data meets or exceeds rest requirements through a single effort, a 4 when data is protected, routinely reviewed, and checked to ensure it meets compliance, and a 5 when data is protected via key rotation, thoroughly documented, and backup system in place. The management category is scored a 1 when management is aware of data at rest policy within the enterprise, a 2 when management has applied data at rest requirements to SIEM and log management properties, a 3 when management enforces and follows data at rest policy, a 4 when management is able to repeat how the data is classified within SIEM as to how the data is protected at rest, and a 5 when management documents and publishes data at rest. The execution category is scored 0-5 based on the quality of the execution of the tasks.

Data in motion requirements subcomponent 140 includes the five categories described above. The vision and strategy category is scored a 1 when there is recognition that logs in motion are or are not protected, a 2 when a conscious effort has been made to determine whether logs need to be protected while in motion, a 3 when a requirement states that raw information should or should not be protected, a 4 when data in motion strategy exists and is verbally communicated, and a 5 when data in motion strategy is in place. The people category is scored a 1 when someone knows about the data in motion policy and how it applies to SIEM, a 2 when data in motion is communicated that it meets enterprise requirements, a 3 when there is enterprise awareness of sensitive data resting, a 4 when there are controls or checks on classification of data sets prior to retrieval, and a 5 when the enterprise continues to improve data classification through log separation. The infrastructure category is scored a 1 when data is protected by limited access to the data at rest, a 2 when data is protected in some form from end users accessing it, a 3 when data meets or exceeds rest requirements through a single effort, a 4 when data is protected while in motion, routinely reviewed, and checked to ensure it meets compliance, and a 5 when data is protected via key rotation, thoroughly documented, and backup system in place. The management category is scored a 1 when management is aware of data in motion policy within the enterprise, a 2 when management has applied data in motion requirements to SIEM and log management properties, a 3 when management enforces and follows data in motion policy, a 4 when management is able to repeat how the data is classified within SIEM as to how the data is protected in motion, and a 5 when management documents and publishes data in motion. The execution category is scored 0-5 based on the quality of the execution of the tasks.

Data in use requirements subcomponent 142 includes the five categories described above. The vision and strategy category is scored a 1 when there is recognition that SIEM content can be sensitive, a 2 when a conscious effort has been made to determine whether logs need to be protected while in use, a 3 when a requirement states that raw information should or should not be protected, a 4 when data in use strategy exists and is verbally communicated, and a 5 when data in use strategy is in place. The people category is scored a 1 when someone knows about the data in use policy and how it applies to SIEM, a 2 when data in use is communicated that it meets enterprise requirements, a 3 when there is enterprise awareness of sensitive data resting, a 4 when there are controls or checks on classification of data sets prior to retrieval, and a 5 when the enterprise continues to improve data security through log separation. The infrastructure category is scored a 1 when data is protected by limited access to the machine, data in, and data out, a 2 when data is protected in some form from end users accessing it, a 3 when data meets or exceeds in motion requirements through a single effort, a 4 when data is protected while in use, routinely reviewed, and checked to ensure it meets compliance, and a 5 when data is protected via key rotation, thoroughly documented, and backup system in place. The management category is scored a 1 when management is aware of data in use policy within the enterprise, a 2 when management has applied data in use requirements to SIEM and log management properties, a 3 when management enforces and follows data in use policy, a 4 when management is able to repeat how the data is classified within SIEM as to how the data is protected in use, and a 5 when management documents and publishes data in use. The execution category is scored 0-5 based on the quality of the execution of the tasks.

Security log audit subcomponent 144 includes the five categories described above. The vision and strategy category is scored a 1 when there is a concept of auditing to ensure log elements are present, a 2 when a vision exists to ensure correct log data, a 3 when the vision has been documented, a 4 when log auditing is managed and measureable via the vision, and a 5 when routine optimization is present. The people category is scored a 1 when there is a concept of people auditing to ensure log elements are present, a 2 when the SIEM team understands the importance of ensuring correct log data, a 3 when a process is in place to ensure awareness of log elements in the log stream, a 4 when log element auditing is communicated at all levels, and a 5 when continual optimization is present. The infrastructure category is scored a 1 when there is capability to review raw log data inside the system, a 2 when capability exists to map requirement elements to what is in SIEM tool, a 3 when capability exists to report on corrupted log data incoming into the SIEM, a 4 when automation exists to ensure log elements are present inside the log stream, and a 5 when optimization has been considered to ensure log element auditing. The management category is scored a 1 when management is aware of the need to ensure log element auditing, a 2 when management provides resources to audit effectiveness of logging, a 3 when management receives reports on logging posture, a 4 when there is trending capability to ensure that logging posture is acceptable, and a 5 when continual improvement from a management perspective is present. The execution category is scored 0-5 based on the quality of the execution of the tasks.

Asset decommissioning subcomponent 146 includes the five categories described above. The vision and strategy category is scored a 1 when there is a concept of knowing what to do with an asset when it is not needed, a 2 when an idea has been verbally communicated with respect to an asset going away, a 3 when there is a strategy documented on what to do when an asset is no longer needed, a 4 when the strategy is well communicated and aligns with overall business strategy, and a 5 when continual improvement is present. The people category is scored a 1 when at least one person knows what to do when an asset is no longer needed, a 2 when most of the SIEM team understands how to decommission an asset, a 3 when any member of operations team understands how decommissioning works, a 4 when communication exists on disseminating asset decommissioning knowledge, and a 5 when continual optimization is discussed. The infrastructure category is scored a 1 when there is a manual process to determine if an asset is no longer needed within the SIEM capabilities, a 2 when a notification exists to determine if an asset is no longer needed, a 3 when automation exists to report on when an asset is decommissioned, a 4 when automation exists to remove the asset that has been decommissioned from SIEM capabilities, and a 5 when continual optimization has been considered to enhance the decommissioning. The management category is scored a 1 when management is aware of the need to deal with an asset no longer being used, a 2 when management is aware of content and raw log data that needs to be kept post asset decommissioning, a 3 when there is strategy to align with business goals, a 4 when management is given reports in success or failure of removing assets from environment, and a 5 when management is continually looking at ways to handle assets going away. The execution category is scored 0-5 based on the quality of the execution of the tasks.

FIG. 4(e) illustrates details about the infrastructure management component 60 of SIEM framework 50. Infrastructure management component 60 includes a definition of ownership subcomponent 148, a business classification subcomponent 150, an infrastructure monitoring subcomponent 152, and an operational maintenance subcomponent 154.

Definition of ownership subcomponent 148 includes a definition of ownership subcomponent 156. Business classification subcomponent 150 includes defined business classification subcomponent 158, a service level agreements subcomponent 160, and a disaster recovery plan subcomponent 162. Infrastructure monitoring subcomponent 152 includes a hardware monitoring subcomponent 164, an application monitoring subcomponent 166, and a storage monitoring subcomponent 168. Operational maintenance subcomponent 154 includes a software development lifecycle subcomponent 170.

Definition of ownership subcomponent 156 includes the five categories described above. The vision and strategy category is scored a 1 when an idea of an SIEM owner is in place, a 2 when there is a verbal agreement of who manages which part of SIEM, a 3 when a strategy exists to break up components of SIEM for ownership, a 4 when ownership and separation of duties align with rest of enterprise, and a 5 when separation of duties is documented. The people category is scored a 1 when one person is not doing everything, a 2 when SIEM is broken up into multiple stakeholders who are aware of their responsibility, a 3 when stakeholders understand their role and participate in role requirements, a 4 when stakeholder ownership is documented and understood, and aligns with a framework, and a 5 when backup exists and is documented. The infrastructure category is scored a 1 when SIEM component breakdown is documented, a 2 when there is a manual process for reporting to respective components, a 3 when ownership and SLA's are mapped together, a 4 when workflows exist for automating ownership separation, and a 5 when workflows and ownership separations are tracked. The management category is scored a 1 when management is aware of need to separate and define ownerships between platform, data, and content, a 2 when multiple groups are involved in determining which tasks get assigned to which groups, a 3 when management supports separation of duties, a 4 when management tracks ownership, tracking is given proper resources to accomplish goals, and a 5 when there is yearly review and budget planning per group. The execution category is scored 0-5 based on the quality of the execution of the tasks.

Service level agreements subcomponent 160 includes the five categories described above. The vision and strategy category is scored a 1 when SLA's and metrics exist within the enterprise, a 2 when SLA's and metrics exist and are valid for SIEM, a 3 when SLA's and metrics have been discussed for SIEM, a 4 when SLA's and metrics map back to a requirement, and a 5 when metrics and SLA's are enhanced yearly. The people category is scored a 1 when someone knows about metrics and SLA's within the enterprise, a 2 when all SIEM team members are aware of metrics and SLA's, a 3 when all SIEM team members can verbally discuss and locate metrics and SLA's, a 4 when metrics and SLA's are enforced by management, and a 5 when remediation occurs when metrics or SLA's do not hit their targets. The infrastructure category is scored a 1 when SLA's and metrics are tracked verbally, a 2 when SLA's and metrics are tracked in a document, a 3 when SLA's and metrics are tracked via an automated portal, a 4 when SLA's and metric automatically generate reports, and a 5 when such reports are sent to stakeholders. The management category is scored a 1 when management is aware of SLA's and metrics, a 2 when management tracks ad-hoc performance over time, a 3 when management is given reports on SLA's and metrics achieved, a 4 when management is given reports on SLA's and metrics achieved over time, and a 5 when management conducts enhancements to SLA's and metrics. The execution category is scored 0-5 based on the quality of the execution of the tasks.

Disaster recovery plan (DR) subcomponent 162 includes the five categories described above. The vision and strategy category is scored a 1 when a vision of a DR plan exists, a 2 when vision is communicated at a management level, a 3 when DR vision is communicated to all divisions and people, a 4 when DR plan is well defined and all parties are involved, and a 5 when DR plan reviewed and strategy updated. The people category is scored a 1 when upper management is aware of DR plan, a 2 when internal SIEM people are aware of DR plan, a 3 when key stakeholders are aware of DR plan, a 4 when SIEM owners publish DR plan to all involved parties, and a 5 when the enterprise understands what the log collection and SIEM capabilities are and DR plans associated with them. The infrastructure category is scored a 1 when DR plan calls for infrastructure components exists, a 2 when DR components have been tested once, a 3 when DR components have been tested annually, a 4 when DR components have been tested annually with verification of SLA's and metrics, and a 5 when lessons learned conducted each time DR plan executed. The management category is scored a 1 when management is aware of the DR plan, a 2 when management approves the DR plan, a 3 when management mandates that the DR plan be tested, a 4 when management takes part in the DR plan testing, and a 5 when management reviews results of annual testing. The execution category is scored 0-5 based on the quality of the execution of the tasks.

Hardware monitoring subcomponent 164, application monitoring subcomponent 166, and storage monitoring subcomponent 168 include the five categories described above. The vision and strategy category is scored a 1 when there is a concept of monitoring the SIEM component, a 2 when there is a clear direction for monitoring requirements for this component, a 3 when those requirements have been formulated into a monitoring strategy, a 4 when that strategy has been approved and measureable, and a 5 when that strategy is also enhanced yearly. The people category is scored a 1 when technical leads are aware of a monitoring concept, a 2 when SIEM people are aware of SIEM component monitoring, a 3 when management is involved in monitoring strategy and execution, a 4 when management receives reports on monitoring, and a 5 when management reviews lessons learned. The infrastructure category is scored a 1 when a person ad-hoc monitors manually, a 2 when a document informs person to check according to schedule, a 3 when some form of automation exists to monitor health, a 4 when automation is multi-layered to ensure health of component is monitored 24/7, and a 5 when automation is tested annually to ensure workflows work correctly. The management category is scored a 1 when management is aware of the need to monitor hardware, a 2 when management sets policy, a 3 when management is involved on monitoring escalations, a 4 when management reviews escalations and provides feedback, and a 5 when management tracks escalations. The execution category is scored 0-5 based on the quality of the execution of the tasks.

Software development life cycle (SDLC) subcomponent 170 includes the five categories described above. The vision and strategy category is scored a 1 when there is an idea to a SDLC in the enterprise, a 2 when the SDLC methods are discussed within the SIEM team, a 3 when routine processes are considered through the SDLC, a 4 when SDLC is routinely considered during P & P crafting, and a 5 when SDLC aligns with organizational policy and standards. The people category is scored a 1 when a basic understanding exists for SDLC and SIEM, a 2 when SIEM people follow SDLC loosely when performing routine processes, a 3 when all people follow the SDLC built into the processes, a 4 when capability exists to track people following SDLC, and a 5 when there is an effort to enhance existing SDLC processes. The infrastructure category is scored a 1 when ad-hoc workflow exists with documented procedures, a 2 when a document exists with some form of tracking, a 3 when SDLC tracking tool exists, a 4 when process and procedures exist within the workflow tool, and a 5 when progress tracking is taking place within the workflow tool. The management category is scored a 1 when management buys into the requirement that P & P should map to a SDLC, a 2 when management allows resources to follow P & P mapped to a SDLC, a 3 when management tracks progress toward SDLC processes, a 4 when management provides reparations or approval if deviation happens, and a 5 when management has checks and balances to the SDLC. The execution category is scored 0-5 based on the quality of the execution of the tasks.

FIG. 4(f) illustrates details about the SIEM operations component 62 of SIEM framework 50. SIEM operations component 60 includes a reporting subcomponent 172, a dashboards subcomponent 174, an incident detection subcomponent 176, an incident management subcomponent 178, and an SIEM enrichment subcomponent 180.

Reporting subcomponent 172 includes a use case definition subcomponent 182 and a content development process 184. Dashboards subcomponent 174 includes a use case definition subcomponent 186 and a content development process 188. Incident detection subcomponent 152 includes a use case definition subcomponent 190 and a content development process 192. Incident management subcomponent 178 includes an incident management subcomponent 194. SIEM enrichment subcomponent 180 includes a referential data injection subcomponent 196.

Use case definition subcomponent 182 includes the five categories described above. The vision and strategy category is scored a 1 when there is a concept of a purpose that a report can solve, a 2 when dashboards to have reports are not run, a 3 when a stakeholder has been identified for each report, a 4 when reports are reviewed on an annual basis, and a 5 when reports are trended and reviewed to see if use case is solved. The people category is scored a 1 when there is a basic awareness of reports and capabilities, a 2 when communication exists within the SIEM team capabilities of reports, a 3 when basic communication outside of SIEM operations about report capabilities exist, a 4 when consistent report messaging exists, and a 5 when reports are socialized at all levels. The infrastructure category is scored a 1 when reports are being created by SIEM administrators, a 2 when basic email or verbal instruction on how to create reports exists, a 3 when form based request on report creation exists, a 4 when use case definition is carefully reviewed, and a 5 when continual process improvement exists. The management category is scored a 1 when management is aware reports can be created and modified to solve business problems, a 2 when management is aware of use case definitions and purposeful content creation, a 3 when management has some form of approval or awareness of use cases being defined, a 4 when use cases are measured on creation and validity, and a 5 when management is looking for a way to improve use case definitions, content creation, and report development. The execution category is scored 0-5 based on the quality of the execution of the tasks.

Content development process subcomponent 184 includes the five categories described above. The vision and strategy category is scored a 1 when reports are innovated by a single person with a single buy-in, a 2 when reports are created via a written document or email solving problem, a 3 when reports are created from workflow on tasks, a 4 when reports are created via workflow and sign-off or buy-in is included, and a 5 when reports creation is constantly being improved via automation techniques. The people category is scored a 1 when a single person is creating reports, a 2 when a form of report review exists, a 3 when report review is done by the SIEM operations team, a 4 when some form of multiple review process takes place to ensure content created is effective, and a 5 when a multi-layer process is enabled to have all key stakeholders of the content approve of the content prior to moving to production. The infrastructure category is scored a 1 when reports are created in a lab from the use case, a 2 when reports are tested in a lab, a 3 when reports are tested in a lab against production data and approved, a 4 when a SDLC process is followed to ensure smooth rollout of content, and a 5 when change control exists and SDLC followed. The management category is scored a 1 when management is aware of content being created outside of OOTB, a 2 when management provides resources to develop and innovate content, a 3 when management has capability to track how many new reports are created to determine staffing levels, a 4 when management receives content creation reports, and a 5 when management is looking for a way to automate, enhance, and develop IP. The execution category is scored 0-5 based on the quality of the execution of the tasks.

Use case definition subcomponent 186 includes the five categories described above. The vision and strategy category is scored a 1 when there is a concept of a purpose that a dashboard can solve, a 2 when dashboards to have dashboards are not run, a 3 when a stakeholder has been identified for each dashboard, a 4 when dashboards are reviewed on an annual basis, and a 5 when dashboards are trended and reviewed to see if use case is solved. The people category is scored a 1 when there is a basic awareness of dashboards and capabilities, a 2 when communication exists within the SIEM team capabilities of reports, a 3 when basic communication outside of SIEM operations about dashboard capabilities exist, a 4 when consistent dashboard messaging exists, and a 5 when dashboards are socialized at all levels. The infrastructure category is scored a 1 when dashboards are being created by SIEM administrators, a 2 when basic email or verbal instruction on how to create dashboards exists, a 3 when form based request on dashboard creation exists, a 4 when use case definition is carefully reviewed, and a 5 when continual process improvement exists. The management category is scored a 1 when management is aware dashboards can be created and modified to solve business problems, a 2 when management is aware of use case definitions and purposeful content creation, a 3 when management has some form of approval or awareness of use cases being defined, a 4 when use cases are measured on creation and validity, and a 5 when management is looking for a way to improve use case definitions, content creation, and dashboard development. The execution category is scored 0-5 based on the quality of the execution of the tasks.

Content development process subcomponent 188 includes the five categories described above. The vision and strategy category is scored a 1 when dashboards are innovated by a single person with a single buy-in, a 2 when dashboards are created via a written document or email solving problem, a 3 when dashboards are created from workflow on tasks, a 4 when dashboards are created via workflow and sign-off or buy-in is included, and a 5 when dashboards creation is constantly being improved via automation techniques. The people category is scored a 1 when a single person is creating dashboards, a 2 when a form of dashboard review exists, a 3 when dashboard review is done by the SIEM operations team, a 4 when some form of multiple review process takes place to ensure content created is effective, and a 5 when a multi-layer process is enabled to have all key stakeholders of the content approve of the content prior to moving to production. The infrastructure category is scored a 1 when dashboards are created in a lab from the use case, a 2 when dashboards are tested in a lab, a 3 when dashboards are tested in a lab against production data and approved, a 4 when a SDLC process is followed to ensure smooth rollout of content, and a 5 when change control exists and SDLC followed. The management category is scored a 1 when management is aware of content being created outside of OOTB, a 2 when management provides resources to develop and innovate content, a 3 when management has capability to track how many new dashboards are created to determine staffing levels, a 4 when management receives content creation dashboards, and a 5 when management is looking for a way to automate, enhance, and develop IP. The execution category is scored 0-5 based on the quality of the execution of the tasks.

Use case definition subcomponent 190 includes the five categories described above. The vision and strategy category is scored a 1 when there is a concept of a purpose that a correlation alert can solve, a 2 when correlation alerts to have correlation alerts are not run, a 3 when a stakeholder has been identified for each correlation alert, a 4 when correlation alerts are reviewed on an annual basis, and a 5 when correlation alerts are trended and reviewed to see if use case is solved. The people category is scored a 1 when there is a basic awareness of correlation alerts and capabilities, a 2 when communication exists within the SIEM team capabilities of reports, a 3 when basic communication outside of SIEM operations about correlation alerts capabilities exist, a 4 when consistent correlation alert messaging exists, and a 5 when correlation alerts are socialized at all levels. The infrastructure category is scored a 1 when correlation alerts are being created by SIEM administrators, a 2 when basic email or verbal instruction on how to create correlation alerts exists, a 3 when form based request on correlation alert creation exists, a 4 when use case definition is carefully reviewed, and a 5 when continual process improvement exists. The management category is scored a 1 when management is aware correlation alerts can be created and modified to solve business problems, a 2 when management is aware of use case definitions and purposeful content creation, a 3 when management has some form of approval or awareness of use cases being defined, a 4 when use cases are measured on creation and validity, and a 5 when management is looking for a way to improve use case definitions, content creation, and correlation alert development. The execution category is scored 0-5 based on the quality of the execution of the tasks.

Content development process subcomponent 192 includes the five categories described above. The vision and strategy category is scored a 1 when correlation alerts are innovated by a single person with a single buy-in, a 2 when correlation alerts are created via a written document or email solving problem, a 3 when correlation alerts are created from workflow on tasks, a 4 when correlation alerts are created via workflow and sign-off or buy-in is included, and a 5 when correlation alerts creation is constantly being improved via automation techniques. The people category is scored a 1 when a single person is creating correlation alerts, a 2 when a form of correlation alert review exists, a 3 when correlation alert review is done by the SIEM operations team, a 4 when some form of multiple review process takes place to ensure content created is effective, and a 5 when a multi-layer process is enabled to have all key stakeholders of the content approve of the content prior to moving to production. The infrastructure category is scored a 1 when correlation alerts are created in a lab from the use case, a 2 when correlation alerts are tested in a lab, a 3 when correlation alerts are tested in a lab against production data and approved, a 4 when a SDLC process is followed to ensure smooth rollout of content, and a 5 when change control exists and SDLC followed. The management category is scored a 1 when management is aware of content being created outside of OOTB (outside of the box), a 2 when management provides resources to develop and innovate content, a 3 when management has capability to track how many new correlation alerts are created to determine staffing levels, a 4 when management receives content creation correlation alerts, and a 5 when management is looking for a way to automate, enhance, and develop IP. The execution category is scored 0-5 based on the quality of the execution of the tasks.

Incident management subcomponent 194 includes the five categories described above. The vision and strategy category is scored a 1 when responses to alerts are done casually and verbally communicated, a 2 when there is a strategy for incident alerts and management, a 3 when strategy and incident response plan is documented, a 4 when SIEM people are aware of the incident response plan, and a 5 when the incident response plan is reviewed and communicated throughout the enterprise. The people category is scored a 1 when incidents are ad-hoc responded to, a 2 people are able to follow a loosely defined response plan, a 3 when all team members are able to proceed in the same manner and follow the same steps in an incident response plan, a 4 when capability exists to track people, and a 5 when optimization exists and trending is performed to track progress. The infrastructure category is scored a 1 when workflow of incident response is completed on some document, a 2 when a consistent template is used to perform workflow for triage of incidents, a 3 when some form of automation exists inside a tool, a 4 when a form of automation exists and basic statistics exist on performance resolution time, and a 5 traceable metrics exist. The management category is scored a 1 when management is aware of an incident response plan, a 2 when management demonstrates concern for results, a 3 when management takes part in reviewing metrics on incident triage, a 4 when management is delivered metrics on incident triage and response, and a 5 when management is looking for a way to improve metrics. The execution category is scored 0-5 based on the quality of the execution of the tasks.

Referential data injection subcomponent 196 includes the five categories described above. The vision and strategy category is scored a 1 when it is understood that a single log cannot triage and provide information needed to make an accurate decision, a 2 when there is a defined list of attributes required to assist in incident response, detection and additional insight, a 3 when there is a strategy is in place to obtain those attributes or pieces of referential data, a 4 when pieces of required data are defined, a form of automation game plan exists, and data is fed to the analysts, and a 5 when the strategy is consistently reviewed to ensure optimal, additional use cases are thought of on how this data collection can be leveraged. The people category is scored a 1 when one person within the organization is aware of data enrichment techniques, a 2 when everybody within the analyst team is capable of enriching incidents in some form of repeatable steps, a 3 when everybody is capable of enriching the data through same repeatable methods, a 4 when tracking and maturity is elevated across all analysts, and a 5 when continual optimization occurs for cross training, enablement, and refinement of any manual or automation task for enriching data. The infrastructure category is scored a 1 when manual process goes to reach out to additional systems to collect additional data to store in some form of document, a 2 when there is a documented process to collect additional pieces of data, a 3 when some form of automation exists to collect data, a 4 when referential data is automatically collected during incident detection, and a 5 when additional optimization occurs. The management category is scored a 1 when management is aware of the need of additional information, a 2 when management approves of decisions on which data gets injected into the incident, a 3 when management provides resources to accomplish automation to enrich incidents, a 4 when management provides capabilities to achieved desired vision for automation and data enrichment, and a 5 when there is continual optimization and tracking of resolve time with data enrichment. The execution category is scored 0-5 based on the quality of the execution of the tasks.

Figure 4G:
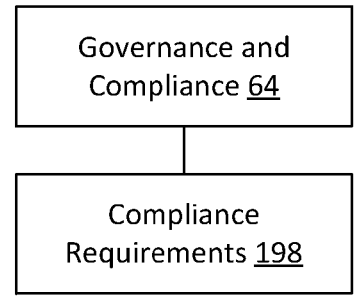
FIG. 4(g) is a tree diagram illustrating example subcomponents of a component shown in FIG. 3.

FIG. 4(g) illustrates details about the governance and compliance component 64 of SIEM framework 50. Governance and compliance component 60 includes a compliance requirements subcomponent 198.

Requirements subcomponent 198 includes the five categories described above. The vision and strategy category is scored a 1 when the organization is aware how SIEM and workflow can assist compliance, a 2 when a verbal strategy exists on how SIEM can complement compliance, a 3 when a documented or written strategy exists on how SIEM will assist compliance, a 4 when the ability exists to track compliance requirements within the SIEM, and a 5 when the SIEM compliance strategy aligns with the business strategy. The people category is scored a 1 when the employees ad-hoc fulfills compliance requirements, a 2 when employees leverage loose procedures such as worksheets or word documents to comply with compliance, a 3 when employees leverage automation to proof of compliance, a 4 when employees are able to determine if they have proven compliance for success metric/report/alert that they have followed requirements, and a 5 when compliance is demonstrated to all levels of the organization on a routine basis. The infrastructure category is scored a 1 when there is a manual process to extract proof of compliance or control from SIEM, a 2 when there is a documented procedure someone follows on a repeatable process to extract control/compliance information, a 3 when some form of automation exists to proof compliance, a 4 when capability exists to track automation and report on compliance automation, and a 5 when there is an optimal form of automation in which there is automated reporting up through the organization on proof of compliance. The management category is scored a 1 when management is aware of compliance requirements the SIEM can fulfill, a 2 when management makes it possible to allow SIEM to fulfill or leverage compensating control to assist proof of compliance, a 3 when management receives reports/trends on progress towards compliance using SIEM, a 4 when management tracks compliance progress, failures, and successes, and a 5 when there is a daily demonstration of compliance. The execution category is scored 0-5 based on the quality of the execution of the tasks.

Figure 4H:
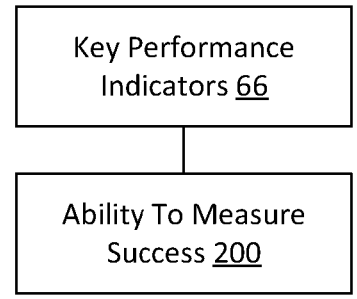
FIG. 4(h) is a tree diagram illustrating example subcomponents of a component shown in FIG. 3.

FIG. 4(h) illustrates details about the key performance indicators (KPI) component 66 of SIEM framework 50. Key performance indicators component 66 includes an ability to measure success subcomponent 200.

Ability to measure success subcomponent 200 includes the five categories described above. The vision and strategy category is scored a 1 when an idea exists to determine the need for success metrics, a 2 when the enterprise has an idea of specific criteria that could go into success metrics, a 3 when a definition of KPI exists within the enterprise, a 4 when the success metrics plan has been communicated, and a 5 when the vision is communicated throughout the enterprise. The people category is scored a 1 when someone in the enterprise understands the need for measurement, a 2 when all people involved in SIEM understand the success metrics, a 3 when decisions relate back to success metrics, a 4 when people involved in SIEM are able to communicate verbally the success measurement for SIEM, and a 5 when there is an annual review of the success measurement. The infrastructure category is scored a 1 when there is an ad-hoc manual verification to check success, a 2 when there is a spreadsheet where manual interaction documents success criteria, a 3 when a form of automation exists provides metric of success, a 4 when a report provides ability to track growth, success, or failure, and a 5 when there is tool to automate notification, trending, and overall success or failure of success metrics. The management category is scored a 1 when management is aware of need to track success metrics, a 2 when management takes part in crafting success metrics, a 3 when management provides routine meetings to track progress, a 4 when management automates tracking KPIs, and a 5 when results of success metrics are reported up the management chain. The execution category is scored 0-5 based on the quality of the execution of the tasks.

While various embodiments of the invention have been particularly shown and described, it will be understood by those skilled in the art that various changes in form and details may be made therein without departing from the spirit and scope of the invention as defined by the appended claims.

It should be understood that some embodiments are directed to a process of providing SIEM infrastructure in a computer networking environment of a client. Also, some embodiments are directed to a computer program product which enables computer logic to provide SIEM infrastructure in a computer networking environment of a client.

In some arrangements, computer 14 is implemented by a set of processors or other types of control/processing circuitry running software. In such arrangements, the software instructions can be delivered, within computer 14, respectively (see FIG. 1), in the form of a computer program product 220, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of providing security incident and event management (SIEM) infrastructure in a computer networking environment of a client, the SIEM infrastructure being constructed and arranged to monitor and record in an event log events within the computer networking environment, the SIEM infrastructure including i) software installed on a computer-readable medium that is configured to generate event log data and incident reports, and ii) hardware on which the software runs, the method comprising:
performing, on a computer, a SIEM maturity evaluation operation that is configured to produce a SIEM maturity result indicative of whether the client has proper resources to achieve a successful implementation of the SIEM infrastructure on the computer networking environment, the successful implementation of the SIEM infrastructure enabling the client to react to events recorded in the event log;
performing an install operation on the SIEM infrastructure in the computer networking environment when the SIEM maturity result indicates that the client has the proper resources to successfully implement the SIEM infrastructure; and
delaying the install operation on the SIEM infrastructure in the computer networking environment when the SIEM maturity result indicates that the client does not have the proper resources to successfully implement the SIEM infrastructure;
wherein the SIEM maturity evaluation operation involves defining a SIEM framework, the SIEM framework including a set of SIEM components, each SIEM component of the set of SIEM components representing a resource necessary for successful implementation of the SIEM infrastructure and having a value that is indicative of a contribution of that SIEM component to the SIEM maturity result;
wherein performing the SIEM maturity evaluation operation includes:
for each SIEM component of the set of SIEM components of the SIEM framework, assigning the value of that SIEM component based on the resources of the client that are represented by that SIEM component.

2. The method as in claim 1,
wherein assigning the value of that SIEM component includes:
generating the value of that SIEM component within a spreadsheet on the computer, the spreadsheet being configured to organize information related to the set of SIEM components such that input for each SIEM component of the set of SIEM components is located in a separate sheet of the spreadsheet.

3. The method as in claim 1,
wherein performing the SIEM maturity evaluation operation further includes:
combining the values of the SIEM components of the set of SIEM components to produce a value of a SIEM maturity score, the SIEM maturity result being based on the value of the SIEM maturity score.

4. The method as in claim 3,
wherein combining the values of the SIEM components of the set of SIEM components includes:
generating, as the value of the SIEM maturity score, an average of the values of the SIEM components of the set of SIEM components.

5. The method as in claim 1,
wherein a SIEM component of the set of SIEM components is a Business Alignment component, the Business Alignment component representing an identification of a mission of the SIEM maturity evaluation operation and stakeholders of the client in the mission;
wherein the value of that Business Alignment component is indicative of the degree to which the client is able to define the mission and the stakeholders;
wherein assigning the value of the SIEM component for the Business Alignment component based on the resources of the client that are represented by that SIEM component includes:
assessing the degree to which the client is able to define the mission and the stakeholders to produce a Business Alignment assessment, and
generating the value based on the Business Alignment assessment.

6. The method as in claim 5,
wherein another SIEM component of the set of SIEM components is an Asset Management component, the Asset Management component representing an identification of event sources, locations, and logical groupings;
wherein the value of the Asset Management component is indicative of the degree to which the client is able to identify the event sources, locations, and logical groupings;
wherein assigning the value of that SIEM component for the Asset Management component based on the resources of the client that are represented by that SIEM component includes:
assessing the degree to which the client is able to define the mission and the stakeholders to produce a Asset Management assessment, and
generating the value based on the Asset Management assessment.

7. The method as in claim 6,
wherein another SIEM component of the set of SIEM components is an Infrastructure Management component, the Infrastructure Management component including business contingency planning, infrastructure monitoring and maintenance;
wherein the value of the Infrastructure Management component is indicative of the degree to which the client is able to identify business contingency planning and infrastructure monitoring and maintenance;

wherein assigning the value of that SIEM component for the Infrastructure Management component based on the resources of the client that are represented by that SIEM component includes:

assessing the degree to which the client is able to define the mission and the stakeholders to produce a Infrastructure Management assessment, and generating the value based on the Infrastructure Management assessment.

8. The method as in claim 1, wherein the value of each SIEM component of the set of SIEM components is composed of values of a set of attributes including Vision and Strategy, People, Infrastructure, Management, and Execution;

wherein assigning the value of that SIEM component based on the resources of the client that are represented by that SIEM component includes:

adding the values of each attribute of the set of attributes to produce the value of the SIEM component.

9. The method as in claim 8, wherein each SIEM component of the set of SIEM components includes a set of subcomponents, each subcomponent of the set of subcomponents of the SIEM component having values of the set of attributes;

wherein adding the values of each attribute of the set of attributes includes:

for each subcomponent of the set of subcomponents, adding the values of each attribute of the set of attributes to produce a subvalue of the subcomponent, and adding the subvalues of each subcomponent of the set of subcomponents to produce the value of the SIEM component.

10. The method as in claim 9, wherein, for each subcomponent of the set of subcomponents, the value of each attribute of the set of attributes the subcomponent is based on a maturity model having a set of levels, a value of each level of the set of five levels being a number between 1 and 5 inclusive and corresponding to a maturity level of the client with respect to that SIEM component;

wherein generating the value of the SIEM component within a spreadsheet on the computer includes:

for each subcomponent of the set of subcomponents, for each attribute of the set of attributes of the subcomponent, assigning a value of a level of the set of levels of the maturity model to that attribute.

11. A computer program product comprising a non-transitory computer readable storage medium which stores code to provide security incident and event management (SIEM) infrastructure in a computer networking environment of a client, the SIEM infrastructure being constructed and arranged to monitor and record in an event log events within the computer networking environment, the SIEM infrastructure including i) software installed on a computer-readable medium that is configured to generate event log data and incident reports, and ii) hardware on which the software runs, the code including instructions which, when performed by a computer, cause the computer to:

perform a SIEM maturity evaluation operation that is configured to produce a SIEM maturity result indicative of whether the client has proper resources to achieve a successful implementation of the SIEM infrastructure on the computer networking environment, the successful implementation of the SIEM infrastructure enabling the client to react to events recorded in the event log;

perform an install operation on the SIEM infrastructure in the computer networking environment when the SIEM maturity result indicates that the client has proper resources to successfully implement the SIEM infrastructure; and delay the install operation on the SIEM infrastructure in the computer networking environment when the SIEM maturity result indicates that the client does not have the proper resources to successfully implement the SIEM infrastructure;

wherein the SIEM maturity evaluation operation involves defining a SIEM framework, the SIEM framework including a set of SIEM components, each SIEM component of the set of SIEM components representing a resource necessary for successful implementation of the SIEM infrastructure and having a value that is indicative of a contribution of that SIEM component to the SIEM maturity result;

wherein performing the SIEM maturity evaluation operation includes:

for each SIEM component of the set of SIEM components of the SIEM framework, assigning the value of that SIEM component based on the resources of the client that are represented by that SIEM component.

12. The computer program product as in claim 11, wherein assigning the value of that SIEM component includes:

generating the value of that SIEM component within a spreadsheet, the spreadsheet being configured to organize information related to the set of SIEM components such that input for each SIEM component of the set of SIEM components is located in a separate sheet of the spreadsheet.

13. The computer program product as in claim 11, wherein performing the SIEM maturity evaluation operation further includes:

combining the values of the SIEM components of the set of SIEM components to produce a value of a SIEM maturity score, the SIEM maturity result being based on the value of the SIEM maturity score.

14. The computer program product as in claim 13, wherein combining the values of the SIEM components of the set of SIEM components includes:

generating, as the value of the SIEM maturity score, an average of the values of the SIEM components of the set of SIEM components.

15. The computer program product as in claim 11, wherein a SIEM component of the set of SIEM components is a Business Alignment component, the Business Alignment component representing an identification of a mission of the SIEM maturity evaluation operation and stakeholders of the client in the mission;

wherein the value of the Business Alignment component is indicative of the degree to which the client is able to define the mission and the stakeholders;

wherein assigning the value of that SIEM component for the Business Alignment component based on the resources of the client that are represented by that SIEM component includes:

assessing the degree to which the client is able to define the mission and the stakeholders to produce a Business Alignment assessment, and generating the value based on the Business Alignment assessment.

16. The computer program product as in claim 11,
wherein the value of each SIEM component of the set of SIEM components is composed of values of a set of attributes representing Vision and Strategy, People, Infrastructure, Management, and Execution;
wherein assigning the value of the SIEM component based on the resources of the client that are represented by that SIEM component includes:
adding the values of each attribute of the set of attributes to produce the value of the SIEM component.

17. The computer program product as in claim 16,
wherein each SIEM component of the set of SIEM components includes a set of subcomponents, each subcomponent of the set of subcomponents of the SIEM component having values of the set of attributes;
wherein adding the values of each attribute of the set of attributes includes:
for each subcomponent of the set of subcomponents, adding the values of each attribute of the set of attributes to produce a subvalue of the subcomponent, and
adding the subvalues of each subcomponent of the set of subcomponents to produce the value of the SIEM component.

18. The computer program product as in claim 17,
wherein, for each subcomponent of the set of subcomponents, the value of each attribute of the set of attributes the subcomponent is based on a maturity model having a set of levels, a value of each level of the set of five levels being a number between 1 and 5 inclusive and corresponding to a maturity level of the client with respect to that SIEM component;
wherein generating the value of the SIEM component within a spreadsheet on the computer includes:
for each subcomponent of the set of subcomponents, for each attribute of the set of attributes of the subcomponent, assigning a value of a level of the set of levels of the maturity model to that attribute.

\* \* \* \* \*